US006858963B2

(12) United States Patent
Neet (10) Patent No.: US 6,858,963 B2
(45) Date of Patent: Feb. 22, 2005

(54) STATOR WINDING HAVING CASCADED END LOOPS

(75) Inventor: Kirk E. Neet, Saline, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 32 days.

(21) Appl. No.: 10/443,644

(22) Filed: May 22, 2003

(65) Prior Publication Data

US 2004/0135458 A1 Jul. 15, 2004

Related U.S. Application Data

(63) Continuation-in-part of application No. 10/324,319, filed on Dec. 19, 2002.

(51) Int. Cl.⁷ .............................................. H02K 17/00
(52) U.S. Cl. ...................................... 310/201; 310/208
(58) Field of Search .............................. 310/179, 180, 310/186, 195, 198, 199, 201–208

(56) References Cited

U.S. PATENT DOCUMENTS

| | | | | |
|---|---|---|---|---|
| 693,579 | A | | 2/1902 | Wait .......................... 310/201 |
| 3,270,229 | A | | 8/1966 | Ruelle et al. ................ 310/180 |
| 3,634,708 | A | | 1/1972 | Fisher ........................ 310/195 |
| 5,097,167 | A | | 3/1992 | Kanayama et al. ......... 310/201 |
| 5,329,197 | A | | 7/1994 | Kudlacik .................... 310/198 |
| 5,331,244 | A | | 7/1994 | Rabe .......................... 310/180 |
| 5,616,977 | A | | 4/1997 | Hill ............................ 310/179 |
| 5,619,088 | A | | 4/1997 | Yumiyama et al. ......... 310/270 |
| 5,744,896 | A | | 4/1998 | Kessinger, Jr. et al. ..... 310/268 |
| 5,955,810 | A | * | 9/1999 | Umeda et al. .............. 310/208 |
| 6,051,906 | A | | 4/2000 | Umeda et al. .............. 310/179 |
| 6,069,424 | A | | 5/2000 | Colello et al. ................ 310/58 |
| 6,268,678 | B1 | * | 7/2001 | Asao et al. ................. 310/201 |
| 6,373,164 | B1 | | 4/2002 | Nishimura .................. 310/207 |
| 6,501,205 | B1 | * | 12/2002 | Asao et al. ................. 310/184 |
| 2002/0079771 | A1 | | 6/2002 | Taji et al. ................... 310/201 |
| 2002/0117928 | A1 | | 8/2002 | Yasuhara et al. ........... 310/201 |

* cited by examiner

*Primary Examiner*—Dang Le
(74) *Attorney, Agent, or Firm*—MacMillan, Sobanski & Todd LLC (57) ABSTRACT

A dynamoelectric machine stator winding having cascaded end loops is adapted to be placed in a plurality of circumferentially spaced axially-extending core slots in a surface of a generally disk-shaped stator core. The core slots extend between a first and a second end of the stator core. The stator includes a plurality of straight segments alternately connected at the first and second ends of the stator core by a plurality of end loop segments to form the winding. The end loops include first and second sloped sides meeting at an apex portion. At least one of the first sloped side and the second sloped side has a body portion offset in a first radial direction. Each of the end loop segments form a cascaded winding pattern.

14 Claims, 6 Drawing Sheets

STATOR WINDING HAVING CASCADED END LOOPS

CROSS-REFERENCE TO RELATED APPLICATIONS

This application is a continuation-in-part of co-pending U.S. patent application Ser. No. 10/324,319 filed Dec. 19, 2002.

BACKGROUND OF THE INVENTION

The present invention relates generally to stators for dynamoelectric machines and, in particular, to an stator winding for a dynamoelectric machines having cascaded end loops.

Dynamoelectric machines, such as alternating current electric generators, or alternators are well known. Prior art alternators typically include a stator assembly and a rotor assembly disposed in an alternator housing. The stator assembly is mounted to the housing and includes a generally cylindrically-shaped stator core having a plurality of slots formed therein. The rotor assembly includes a motor rotor attached to a generally cylindrical shaft that is rotatably mounted in the housing and is coaxial with the stator assembly. The stator assembly includes a plurality of wires wound thereon, forming windings. The stator windings are formed of straight portions that are located in the slots and end loop sections that connect two adjacent straight portions and are formed in a predetermined multi-phase (e.g. three or six) winding pattern in the slots of the stator core. The rotor assembly can be any type of rotor assembly, such as a "claw-pole" rotor assembly, which typically includes opposed poles as part of claw fingers that are positioned around an electrically charged rotor coil. The rotor coil produces a magnetic field in the claw fingers. As a prime mover, such as a steam turbine, a gas turbine, or a drive belt from an automotive internal combustion engine, rotates the rotor assembly, the magnetic field of the rotor assembly passes through the stator windings, inducing an alternating electrical current in the stator windings in a well known manner. The alternating electrical current is then routed from the alternator to a distribution system for consumption by electrical devices or, in the case of an automotive alternator, to a rectifier and then to a charging system for an automobile battery.

A type of alternator well known in the art is a high slot fill stator, which is characterized by rectangular core slots and rectangular shaped conductors that fit closely to the width of the rectangular core slots. High slot fill stators are advantageous because they are efficient and help produce more electrical power per winding than other types of prior art stators. These stators, however, are disadvantageous because the windings are typically interlaced, in which the wires are required to alternate outer and inner radial portions of each slot. These interlaced windings require an interlacing process to interlace the conductors of all the phases prior to inserting the winding into the core and therefore disadvantageously increase the complexity of placing the winding the stator. Other prior art stators have utilized hairpin conductors, in which U-shaped conductors are placed in the core slots from an upper or lower axial end of the stator core. While the hairpin conductors are advantageously not interlaced, the difficulty of manufacturing the stators is still increased because the opposing ends of the U-shaped conductors must be welded to form the stator winding.

It is desirable, therefore, to provide a stator having a winding that meets the requirements of a high slot fill stator but does not require the complex interlaced winding process or the hairpin conductors of the prior art.

SUMMARY OF THE INVENTION

A stator winding for an alternator in accordance with the present invention includes a generally cylindrically-shaped stator core having a plurality of circumferentially spaced and axially-extending core slots in a surface thereof. The core slots extend between a first and a second end of the stator core. The stator also includes a stator winding that has at least one layer of conductors having a plurality of phases. Each of the phases includes a plurality of straight segments that are disposed in the core slots. The straight segments of a phase for the plurality of layers typically lay in one radial row in each slot. The straight segments of the phases are alternately connected at the first and second ends of the stator core by a plurality of end loop segments. The straight segments have a first substantially rectangular cross sectional shape. Each of the end loop segments include first and second sloped sides having substantially the same rectangular cross section. The first and second sloped sides of the end loop segments meet at an apex portion and the first sloped side has a first body portion offset in a first radial direction and having a second rectangular cross-sectional shape. The second sloped side has a second body portion offset in a second radial direction and having a third substantially rectangular cross sectional shape. Preferably, the second substantially rectangular cross-sectional shape is substantially equal to the third substantially rectangular cross-sectional shape and the areas of the first, second, and third cross-sectional shapes are all substantially equal. This provides constant electrical resistance throughout the stator winding. Alternatively, the second and third substantially rectangular cross-sectional shapes are equal to one half the first substantially rectangular cross-sectional shape. This allows the end loops of each phase to have the same form and shape and therefore can be advantageously processed from the same tooling.

A method for manufacturing the stator winding according to the present invention can be practiced by providing the generally rectangular conductors for the stator winding; forming each of the phases of the stator winding to shape; providing the stator core; and inserting each of the phases in sequential order, discussed in more detail below, in a corresponding plurality of the core slots of the stator core.

The cascaded winding pattern in accordance with the present invention advantageously does not require the complex interlaced winding process or the hairpin conductors of the prior art. The stator winding is not interlaced because each of the straight segments are located at the same radial distance from the central axis of the stator core and, therefore, do not alternate rearward and forward positions in the slot with other conductors. Furthermore, because the phases are radially aligned for each layer, and the phases of each layer can be inserted in a sequential order, defined in more detail below. Each of the end loop segments advantageously form a cascaded winding pattern causing no interference between the end loop segments of each of the phases.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
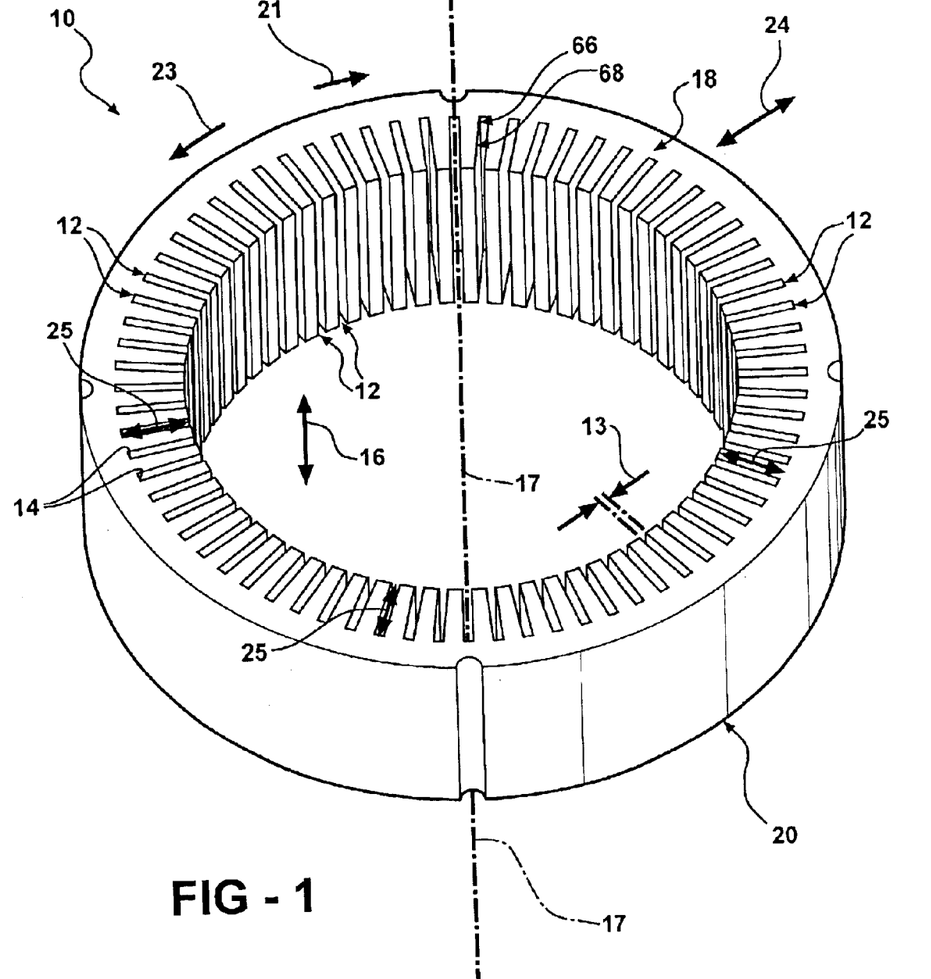
FIG. 1 is a perspective view of a stator core in accordance with the present invention.

Referring now to FIG. 1, a generally cylindrically-shaped stator core is indicated generally at 10. The stator core 10 includes a plurality of core slots 12 formed in a circumferential interior surface 14 thereof. The core slots 12 are generally rectangular in cross section and extend in a direction, indicated by an arrow 16, parallel to a central axis 17 of the stator core 10 between a first end 18 and a second end 20 thereof. The core slots 12 have a generally rectangular volume. An axially upward direction is defined as moving toward the first end 18 of the stator core 10 and an axially downward direction is defined as moving toward the second end 20 of the stator core 10. Preferably, the core slots 12 are equally spaced around the circumferential interior surface 14 of the stator core 10. A circumferential clockwise direction is indicated by an arrow 21 and a circumferential counterclockwise direction is indicated by an arrow 23. The core slots 12 define a depth 25 along a radial axis, indicated by an arrow 24, and are adapted to receive a stator winding, discussed in more detail below. A radial inward direction is defined as moving towards the central axis 17 of the stator core 10 and a radial outward direction is defined as moving away from the central axis 17.

Figure 2:
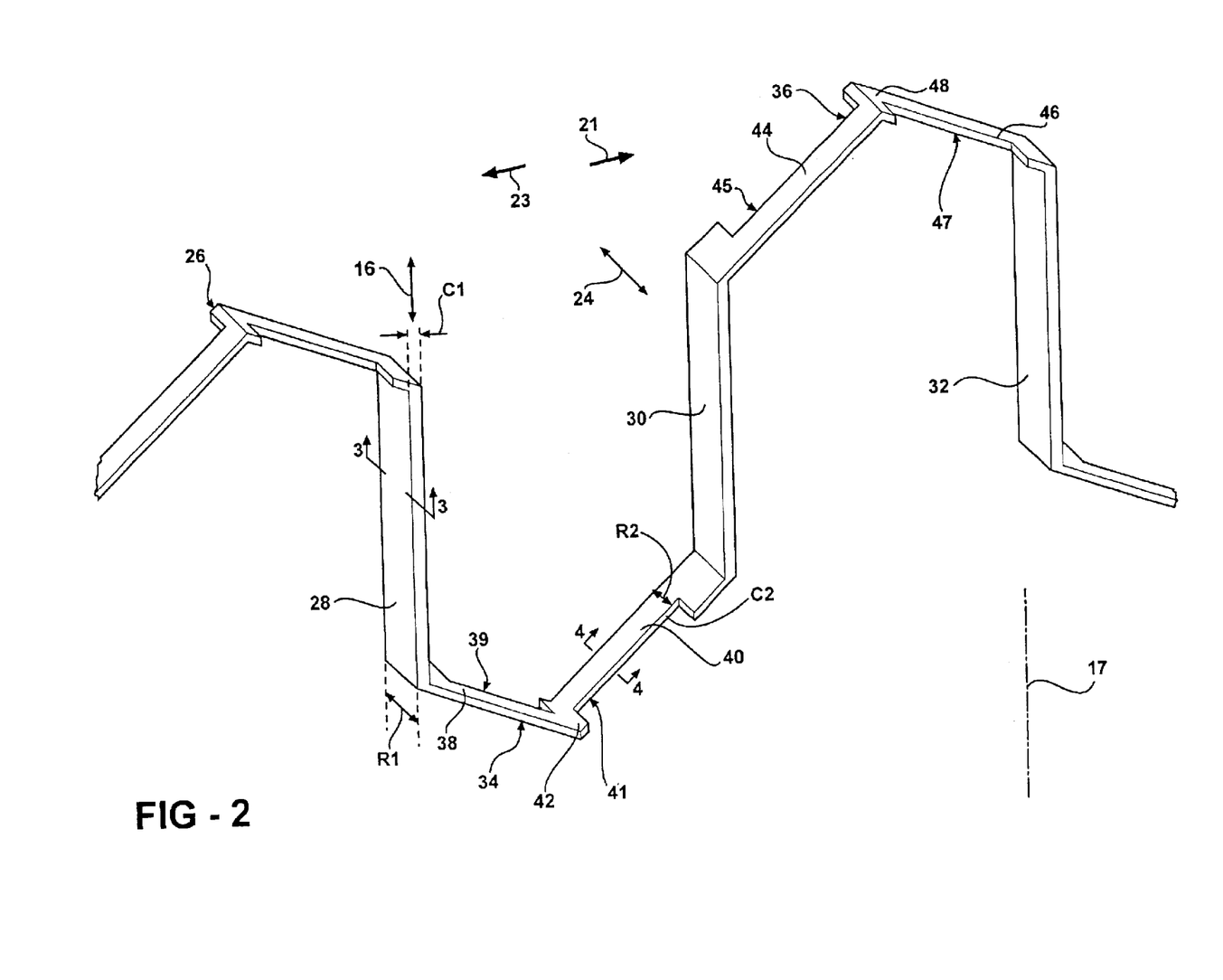
FIG. 2 is a perspective view of a portion of a phase of a stator winding in accordance with the present invention.
Figure 3:
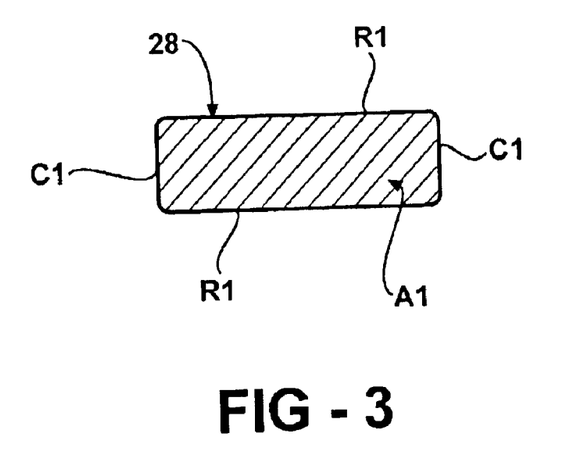
FIG. 3 is a cross-sectional view of a straight segment of the stator winding taken along line 3—3 in FIG. 2.
Figure 4:
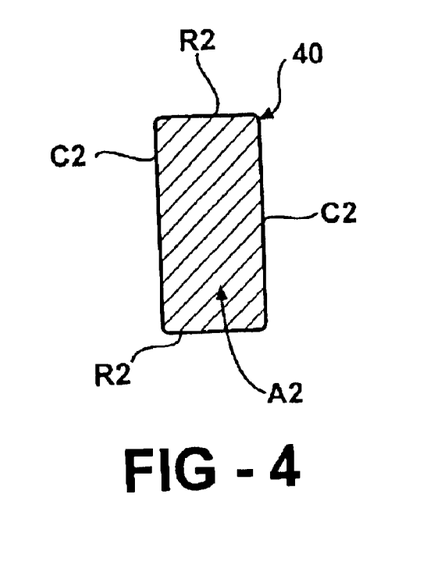
FIG. 4 is a cross-sectional view of an end loop segment of the stator winding taken along line 4—4 in FIG. 2.

Referring now to FIGS. 2, 3, and 4, a portion of a phase of a stator winding for an alternator according to the present invention is indicated generally at 26. The phase portion 26 is preferably a portion of one continuous phase of the alternator winding. Preferably, the phase portion 26 is formed of rectangular wire and includes a first straight segment 28, a second straight segment 30, and a third straight segment 32. The first straight segment 28, the second straight segment 30, and the third straight segment 32 are located at the same radial distance from the central axis 17 of the stator core 10 (i.e. are placed in the same layer when wound onto the stator).

Each of the straight segments 28, 30, and 32 are adapted to be received in a respective axially-extending core slot 12 of the stator core 10. The first straight segment 28 has a first rectangular cross section defined by a radial depth R1, and a circumferential width C1. An area A1 of the first rectangular cross section of the first straight segment 28 is defined by the dimensions R1 and C1, best seen in FIG. 3. Each of the straight segments 28, 30 and 32, therefore, have the first rectangular cross sectional shape with an area A1. The first straight segment 28 and the second straight segment 30 are connected by a first end loop segment 34. The second straight segment 30 and the third straight segment 32 are connected by a second end loop segment 36.

The first end loop segment 34 is located at the second end 20 of the stator core 10 and includes a first sloped side 38 extending in the circumferential clockwise direction 21 and in the axially downward direction from a lower portion of the first straight segment 28. The first sloped side 38 also includes an offset body portion 39 wherein the radially inward edge of the offset body portion 39 is at the same radial location as the radially inward edge of the straight segments 28 and 30 but the radially outward edge of offset body portion 39 is offset a predetermined distance in the radially inward direction. The first end loop segment 34 also includes a second sloped side 40 that extends in the circumferential counterclockwise direction 23 and in the axially downward direction from a lower portion of the second straight segment 30. The second sloped side 40 also includes an offset body portion 41 wherein the radially outward edge of the offset body portion 41 is at the same radial location as the radially outward edge of the straight segments 28 and 30 but the radially inward edge of the offset body portion 41 is offset a predetermined distance in the radially outward direction. The first sloped side 38 and the second sloped side 40 are meet at an apex portion 42.

Similarly, the second end loop segment 36 is located at the first end 18 of the stator core 28 and includes a first sloped side 44 extending in the circumferential clockwise direction 21 and in the axially upward direction from an upper portion of the second straight segment 30. The first sloped side 44 also includes an offset body portion 45 wherein the radially inward edge of the offset body portion 45 is at the same radial location as the radially inward edge of the straight segments 30 and 32 but the radially outward edge of the offset body portion 45 is offset a predetermined distance in the radially inward direction. The second end loop segment 36 also includes a second sloped side 46 that extends in the circumferential counterclockwise direction 23 and in the axially upward direction from an upper portion of the third straight segment 32. The second sloped side 46 also includes an offset body portion 47 wherein the radially outward edge of the offset body portion 47 is at the same radial location as the radially outward edge of the straight segments 30 and 32 but the radially inward edge of the offset body portion 47 is offset a predetermined distance in the radially outward direction. The first sloped side 44 and the second sloped side 46 meet at an apex portion 48.

The second sloped side 40 has a radial depth R2 and a circumferential width C2. An area A2 of the rectangular cross sectional shape of the second sloped side 40 is shown in FIG. 4. The area A2 of the second sloped side 40 is substantially equal to the area A1 of the first straight segment 28. Preferably, the length of R2 is just under half the length of R1 and the length of C2 is just over twice the length of the C1. The first sloped side 38 has a substantially rectangular cross-sectional shape (not shown). Preferably, the area of the cross-sectional shape of the first sloped side 38 is substantially equal to the area A1 of the first straight segment 28 and the area A2 of the second sloped side 40. Those skilled in the art, however, will appreciate that the length and width of the end loop segments 34 and 36 may be varied in any number of combinations to produce an area A2 that is substantially equal to A1 in order to provide constant electrical resistance throughout the length of the phase portion 26 while avoiding interference between cascaded end loops of adjacent phases as described below. Those skilled in the art will also appreciate that the conductors may include a radius (not shown) on the corners between depths R1 and the widths C1 and between R2 and C2 and therefore, the areas A1 and A2 are defined by the widths, depths and radii.

Alternatively, the first end loop segment 34 and the second end loop segment 36 have a cross sectional area A2 that is substantially equal to one half of the area A1 of the first cross section. Preferably, this is accomplished by forming the side R2 equal to just less than one half the length of the side R1 and by forming the side C2 equal to just over the length of the side C1.

While the straight segments 28, 30, and 32 of the phase portion 26 are shown generally coplanar in FIG. 2 for illustrative purposes, the straight segments 28, 30, and 32 phase portion 26 are preferably adapted to be received by a radially curved surface, such as the interior surface 14 of the stator core 10 and, therefore, are not coplanar.

Figure 5:
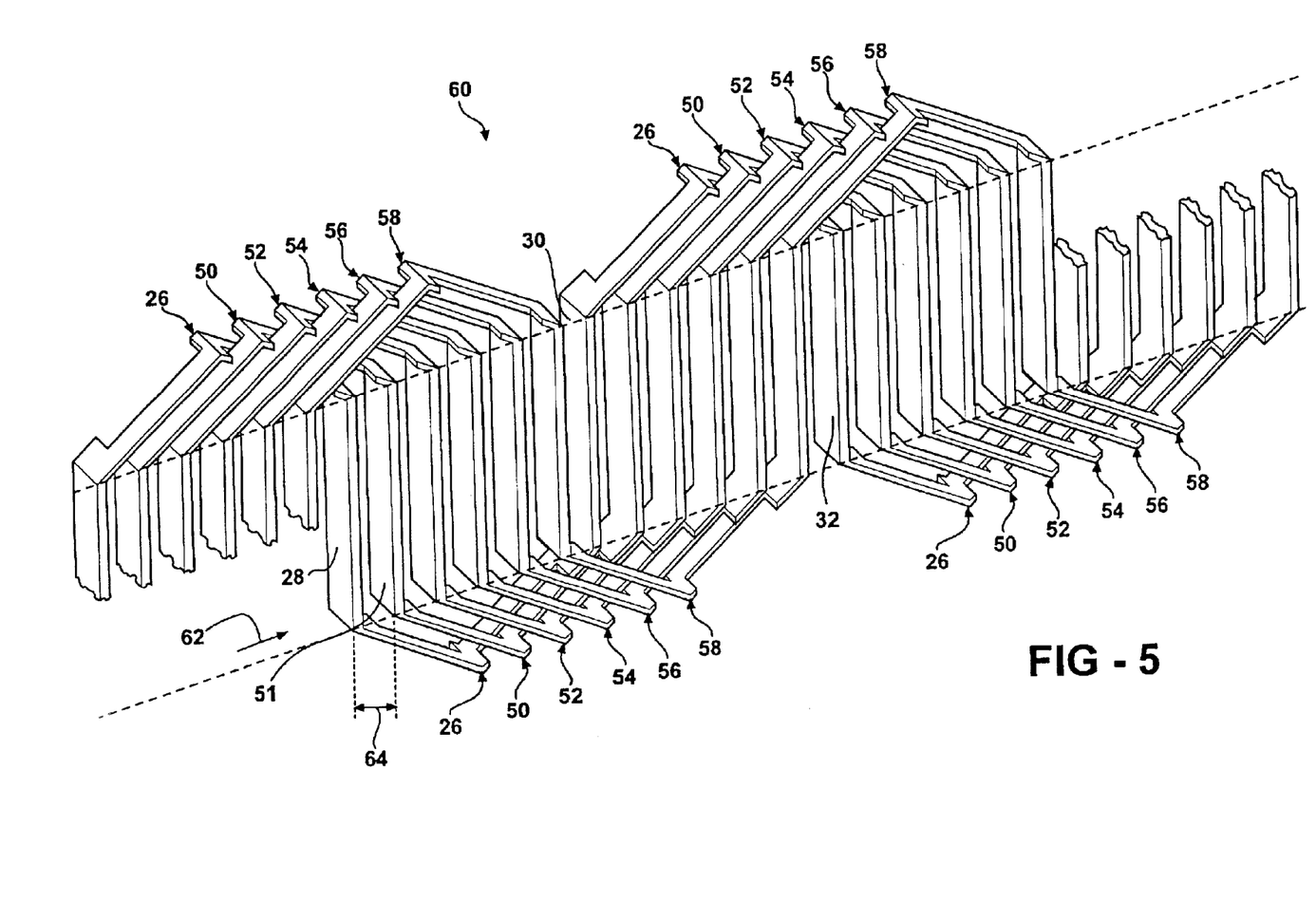
FIG. 5 is a perspective view of the phase portion of FIG. 2 shown adjacent a plurality of other phase portions of a stator winding.

Referring now to FIG. 5, the phase portion 26 of one phase of FIGS. 2, 3, and 4 is shown with a plurality of phase portions, indicated generally at 50, 52, 54, 56, and 58 to form a continuous six phase stator winding, indicated generally at 60. The phase portions 50, 52, 54, 56, and 58 are substantially identical to the phase portion 26, which advantageously allows each of the phase portions 26, 50, 52, 54, 56, and 58 to be processed from the same tooling. Each of the straight segments of the phase portions 26, 50, 52, 54, 56, and 58 are all located at the same radial distance from the central axis 17 of the stator core 10 and form a layer of the stator winding, indicated generally at 62 (i.e., the circumferential layer 62 is flattened into a plane in FIG. 5). The end loop segments of the phase portions 26, 50, 52, 54, 56, and 58 form a cascaded winding pattern shown in FIG. 5 which allows for sequential phase insertion, discussed in more detail below.

The straight segments of each phase of the stator winding 60 are preferably disposed in respective core slots 12 at an equal pitch around the circumference 14 of the stator core 10. Specifically, a straight segment, such as the straight segment 28, of the phase 26 is disposed in a respective core slot 12 adjacent a straight segment 51 of the phase 50. The respective straight segments 28 and 51 of the phases 26 and 50 are spaced apart by a circumferential distance or pitch 64. The circumferential pitch 64 is substantially equal to the circumferential distance between a pair of adjacent core slots 12 in the stator core 10. Each of the straight segments 28, 30, and 32 and each of the end loop segments 34 and 36 of the phase 26 remains disposed adjacent the respective straight segments 51 and end loop segments of the phase 50 at the same circumferential pitch 64 throughout the substantial circumference 14 of the stator core 10.

Preferably, the stator winding 60 is formed in at least two radial layers, which is schematically shown as a first layer location 66 and a second layer location 68 in FIG. 1, which are substantially identical to the layer 62 of FIG. 5. Preferably, the layers 66 and 68 are radially spaced such that the straight segments of the first layer 66 are located radially outward of the straight segments of the second layer 68. The radial depth 25 of each of the core slots 12 of the stator core 10 is adapted to receive the at least two layers 66 and 68. Alternatively, the radial depth 25 of each of the core slots 12 of the stator core 10 is adapted to receive more than two layers of the stator winding 60. Preferably, the circumferential width C1 of each of the straight segments, including any insulation (not shown), of the layers 66 and 68 is slightly less than the circumferential width 13 of the core slots 12, including any insulation (not shown), best seen in FIG. 1. Preferably, the straight segments of the phases 26, 50, 52, 54, 56, and 58 of the layers 66 and 68 are aligned in one radial row in each slot.

The stator winding 60 is assembled according to the following method: providing the generally rectangular conductors for the stator winding 60; forming each layer of the phases 26, 50, 52, 54, 56, and 58 of the stator winding 60 to shape; providing the stator core 10; inserting each of the phases 26, 50, 52, 54, 56, and 58 of the outermost radial layer 66 in sequential order, in a corresponding plurality of the core slots 12 of the stator core 10; and repeating the steps for the layer 68 and for any additional desired layers.

Each of the end loop segments of the phases 26, 50, 52, 54, 56, and 58 of the stator winding 60 are cascaded, meaning that for each pass around the stator core 10, each of the phases can be inserted into the stator core 10 in a sequential order. For example, the first phase 26 is inserted for one substantial revolution about the circumference 14 of the stator core 10. After the phase 26 is inserted, the phase 50 may be inserted for one substantial revolution about the circumference 14 of the stator core 10. This pattern is repeated for each of the phases 52, 54, 56, and 58.

Figure 6:
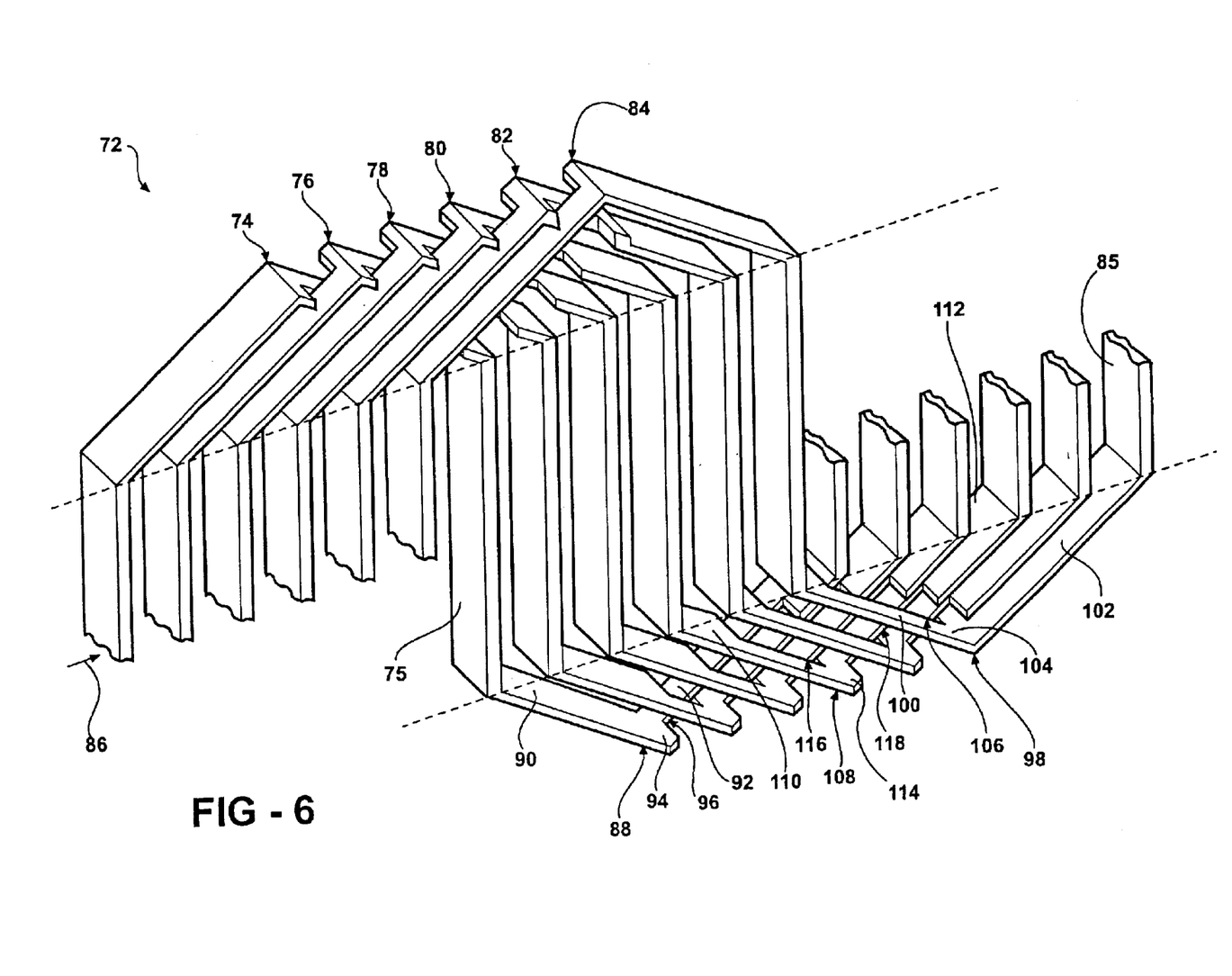
FIG. 6 is a perspective view of an alternative embodiment of a plurality of phase portions in accordance with the present invention.

There is shown in FIG. 6 an alternative embodiment of a stator winding is indicated generally at 72. The stator winding 72 includes a plurality of phase portions, indicated generally at 74, 76, 78, 80, 82, and 84, forming the six phase stator winding 72. Each of the straight segments of the phase portions 74, 76, 78, 80, 82, and 84 are located at the same radial distance from the central axis 17 of the stator core 10 and form a layer of the stator winding 72, indicated generally at 86 (i.e., the circumferential layer 86 is flattened into a plane in FIG. 6). The straight segments of each phase 74, 76, 78, 80, 82, and 84 of the stator winding 72 are preferably disposed in respective core slots 12 at an equal pitch around the circumference 14 of the stator core 10, as outlined above.

An end loop segment 88 of the first phase 74 is shown at a lower portion of FIG. 6. The end loop segment 88 includes a first sloped portion 90 and a second sloped portion 92 that meet at an apex portion 94. The second sloped portion 92 includes an offset body portion 96 wherein the radially outward edge of the offset body portion 96 is at the same radial location as the radially outward edge of a straight segment 75 and the radially outward edge of the first sloped portion 90 but the radially inward edge of the offset body portion 96 is offset a predetermined distance in the radially outward direction.

Similarly, an end loop segment 98 of the sixth phase 84 is shown at a lower portion of FIG. 6. The end loop segment 98 includes a first sloped portion 100 and a second sloped portion 102 that meet at an apex portion 104. The first sloped portion 100 includes an offset body portion 106 wherein the radially inward edge of the offset body portion 106 is at the same radial location as the radially inward edge of a straight segments 85 and the radially inward edge of the second sloped portion 102 but the radially outward edge of the offset body portion 106 is offset a predetermined distance in the radially inward direction.

Similarly, an end loop segment 108 of the fourth phase 80 is shown at a lower portion of FIG. 6. The end loop segment 108 includes a first sloped portion 110 and a second sloped portion 112 that meet at an apex portion 114. The first sloped portion 110 includes an offset body portion 116 wherein the radially inward edge of the offset body portion 116 is at the same radial location as the radially inward edge of the straight segment 75 and 85 but the radially outward edge of the offset body portion 116 is offset a predetermined distance in the radially inward direction. The second sloped portion 112 includes an offset body portion 118 wherein the radially outward edge of the offset body portion 118 is at the same radial location as the radially outward edge of the straight segment 75 and 85 but the radially inward edge of the offset body portion 118 is offset a predetermined distance in the radially outward direction.

An end loop segment for each of the second 76, third 78, and fifth 82 phases also includes a first sloped portion and a second sloped portion that meet at an apex portion. Similar to the end loop segment 108, each of the first and the second sloped portions of the end loop segments of the second 76, third 78, and fifth 82 phases include an offset body portion so the end loop segments of the phases 74, 76, 78, 80, 82, and 84 cause no interference between said end loop segments of each of the phases 74, 76, 78, 80, 82, and 84.

The offset body portions 96 of the first phase 74, the offset body portion 106 for the sixth phase 84, and the offset body portions 116 and 118 of the fourth phase 80 each have a different circumferential length in order to form the cascaded winding pattern as shown. For example, in FIG. 6, the offset body portion 96 of the first phase 74 is greater in circumferential length than the corresponding offset body portion 118 of the fourth phase 80 because the offset body portion 96 must avoid respective the end loop segments of the phases 76, 78, 80, 82, and 84. The offset body portion 118 of the fourth phase 80 must avoid only the respective end loop segments of the phases 82 and 84. The adjacent offset body portions of the first sloped portions of the phases 74, 76, 78, 80, 82, and 84, therefore, are of successively increasingly length, and the adjacent offset body portions of the second sloped portions of the phases 74, 76, 78, 80, 82, and 84 are of successively decreasing length.

Figure 7:
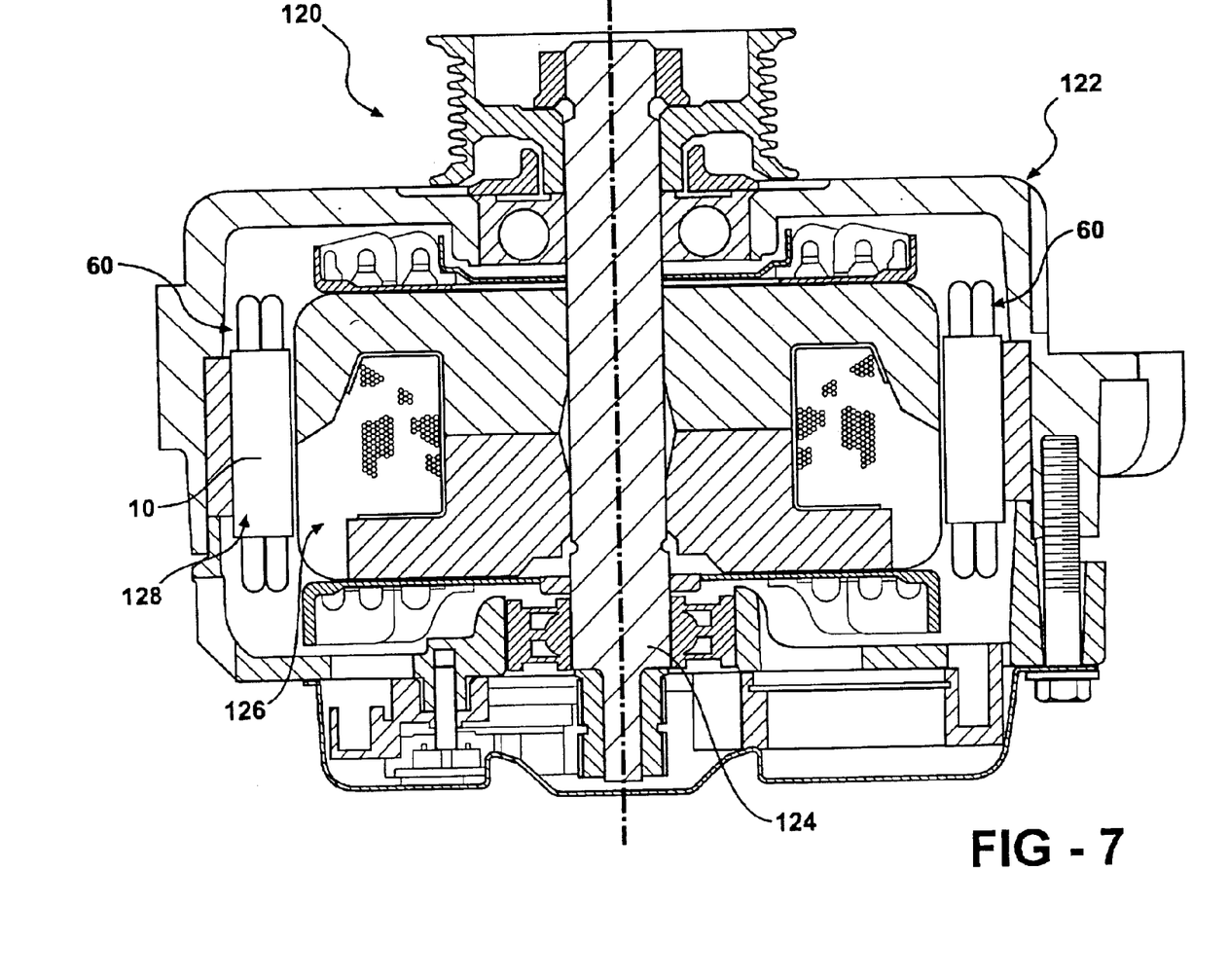
FIG. 7 is a cross-sectional view of a dynamoelectric machine in accordance with the present invention.

Referring now to FIG. 7, a dynamoelectric machine in accordance with the present invention is indicated generally at 120. The dynamoelectric machine is preferably an alternator, but those skilled in the art will appreciate that the dynamoelectric machine can be, but is not limited to, an electric motor, an integrated starter-motor, or the like. The dynamoelectric machine 120 includes a housing 122 having a shaft 124 rotatably supported by the housing 122. A rotor assembly 126 is supported by and adapted to rotate with the shaft 124. The rotor assembly can be, but is not limited to, a "claw pole" rotor, a permanent magnet non claw pole rotor, a permanent magnet claw pole rotor, a salient field wound rotor or an induction type rotor. A stator assembly 128 is fixedly disposed in the housing 122 adjacent the rotor assembly 126. The stator assembly 128 includes a stator core, such as the stator core 10 and winding such as the stator winding 60 having radially aligned layers, such as the layers 66 and 68.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A stator for a dynamoelectric machine, comprising:
  a generally cylindrically-shaped stator core having a plurality of circumferentially spaced axially-extending core slots in a surface thereof, said core slots extending between a first and a second end of said stator core; and
  a stator winding including at least one layer of conductors having a plurality of continuous phases, each of said phases having a plurality of substantially straight segments disposed in said core slots, said straight segments of each phase alternately connected at said first and second ends of said stator core by a plurality of end loop segments to form said winding, said straight segments having a first substantially rectangular cross-sectional shape, said straight segments of said at least one layer being in a same radial distance from a central axis of said stator core,
  wherein at least one of said end loop segments include first and second sloped sides meeting at an apex portion, at least one of said first sloped side and said second sloped side having a body portion offset in a first radial direction within said at least one layer,
  wherein said end loop segments form a cascaded winding pattern.

2. The stator according to claim 1 wherein said first sloped side has a body portion offset in said first radial direction and said second sloped side has a body portion offset in a second radial direction apposite said first radial direction.

3. The stator according to claim 1 wherein said first sloped side has a second substantially rectangular cross-sectional shape and said second sloped side has a third substantially rectangular cross-sectional shape.

4. The stator according to claim 3 wherein an area of said second cross-sectional shape area is substantially equal to an area of said third rectangular cross-sectional shape.

5. The stator according to claim 3 wherein an area of said first cross-sectional shape is substantially equal to said area of said second cross-sectional shape and said area of said third cross-sectional shape.

6. The stator according to claim 1 wherein a one of said second cross-sectional shape and said third cross-sectional shape is equal to substantially one half of said area of said first cross-sectional shape.

7. The stator according to claim 1 wherein each of said phases of said stator is substantially identical.

8. The stator according to claim 1 wherein said stator core slots have a generally rectangular volume.

9. The stator according to claim 1 wherein the width of said straight segments, including any insulation, of said stator winding fit closely to the width of said stator core slots, including any insulation.

10. The stator according to claim 1 wherein said straight segments are disposed in the core slots at an equal circumferential pitch around the circumference of said stator core.

11. The stator according to claim 1 wherein said stator winding includes at least two layers of conductors.

12. The stator according to claim 11 wherein said straight segments of said at least two layers of each said phase are aligned in a radial row in each said core slot.

13. A dynamoelectric machine, comprising:
  a housing;
  a shaft rotatably supported by said housing;
  a rotor supported by and adapted to rotate with said shaft; and
  a stator fixedly disposed in said housing adjacent said rotor, said stator comprising;
  a generally cylindrically-shaped stator core having a plurality of circumferentially spaced axially-extending core slots in a surface thereof, said core slots extending between a first and a second end of said stator core; and
  a stator winding including at least one layer of conductors having a plurality of phases, each of said phases having a plurality of substantially straight segments disposed in said core slots, said straight segments alternately connected at said first and second ends of said stator core by a plurality of end loop segments to form said winding, said straight segments of said at least one layer being in a same radial distance from a central axis of said stator core,
  wherein each of said end loop segments include first and second sloped sides meeting at an apex portion, said first sloped side having a body portion offset in a first radial direction and said second sloped side having a body portion offset in a second radial direction opposite said first radial direction,
  wherein each of said end loop segments form a cascaded winding pattern within their respective layer.

14. The dynamoelectric machine according to claim 13 wherein said straight segments have a first substantially rectangular cross-sectional shape with a radial side R1, a circumferential side C1, said sides R1 and C1 defining a cross sectional area A1, and said first sloped side and said second sloped side have a substantially rectangular cross-sectional shape having an area substantially equal to A1.

* * * * *